United States Patent [19]

Ayers et al.

[11] Patent Number: 4,653,421
[45] Date of Patent: Mar. 31, 1987

[54] SKIMMING AND UTILITY VESSEL THAT EFFECTS SURFACE SEA CONTROL

[75] Inventors: William M. Ayers, Duncan, Okla.; Jayanta K. Basak, Houston, Tex.

[73] Assignee: Halliburton Company, Duncan, Okla.

[21] Appl. No.: 822,015

[22] Filed: Jan. 24, 1986

[51] Int. Cl.[4] ............................................. B63B 35/32
[52] U.S. Cl. .................................. 114/270; 210/242.3; 210/923
[58] Field of Search ...................... 114/270; 210/242.3, 210/242.4, 923, 924

[56] References Cited

U.S. PATENT DOCUMENTS

| 3,142,281 | 7/1964 | Muller .................................. 114/0.5 |
| 3,314,540 | 4/1967 | Lane ........................................ 210/77 |
| 3,646,901 | 3/1972 | Budris et al. . |
| 3,661,263 | 5/1972 | Peterson et al. . |
| 3,662,891 | 5/1972 | Hendrick . |
| 3,684,095 | 8/1972 | Ayers . |
| 3,970,556 | 7/1976 | Gore . |
| 3,980,559 | 9/1976 | Netzell ........................ 210/242.3 X |
| 3,992,292 | 11/1976 | Grimes et al. . |
| 4,033,869 | 7/1977 | McGrew . |
| 4,399,040 | 8/1983 | Ayers et al. .................. 210/242.3 X |

FOREIGN PATENT DOCUMENTS

| 6171 | 1/1977 | Japan ................................ 210/242.3 |
| 2008962 | 6/1979 | United Kingdom ................ 114/270 |

*Primary Examiner*—Joseph F. Peters, Jr.
*Assistant Examiner*—Paul E. Salmon
*Attorney, Agent, or Firm*—James R. Duzan; Robert M. Hessin

[57] ABSTRACT

An oil skimming and utility vessel for operation in significant seas which functions to calm wave action for further oil contaminant separation operations or other marine utility operations. The vessel is a barge having forward tank compartmentation with a large stern compartment formed as sides and bottom tank open to incoming surface wave action from astern. The stern compartment then houses one or more serially arranged combinations of wave dampeners, distributors and conveyors, and baffle structure which functions to calm incoming surface water and/or contaminated oil/water mixtures. In oil skimming operation a porous-type oil stripping conveyor is employed in primary oil removal with a subsequent secondary oil skimming operation in the calm water forward portion of the stern compartment. Alternatively, the stern compartment is configured with the dampener, conveyor and baffle structure to protect a calm water, surface level work station.

5 Claims, 9 Drawing Figures

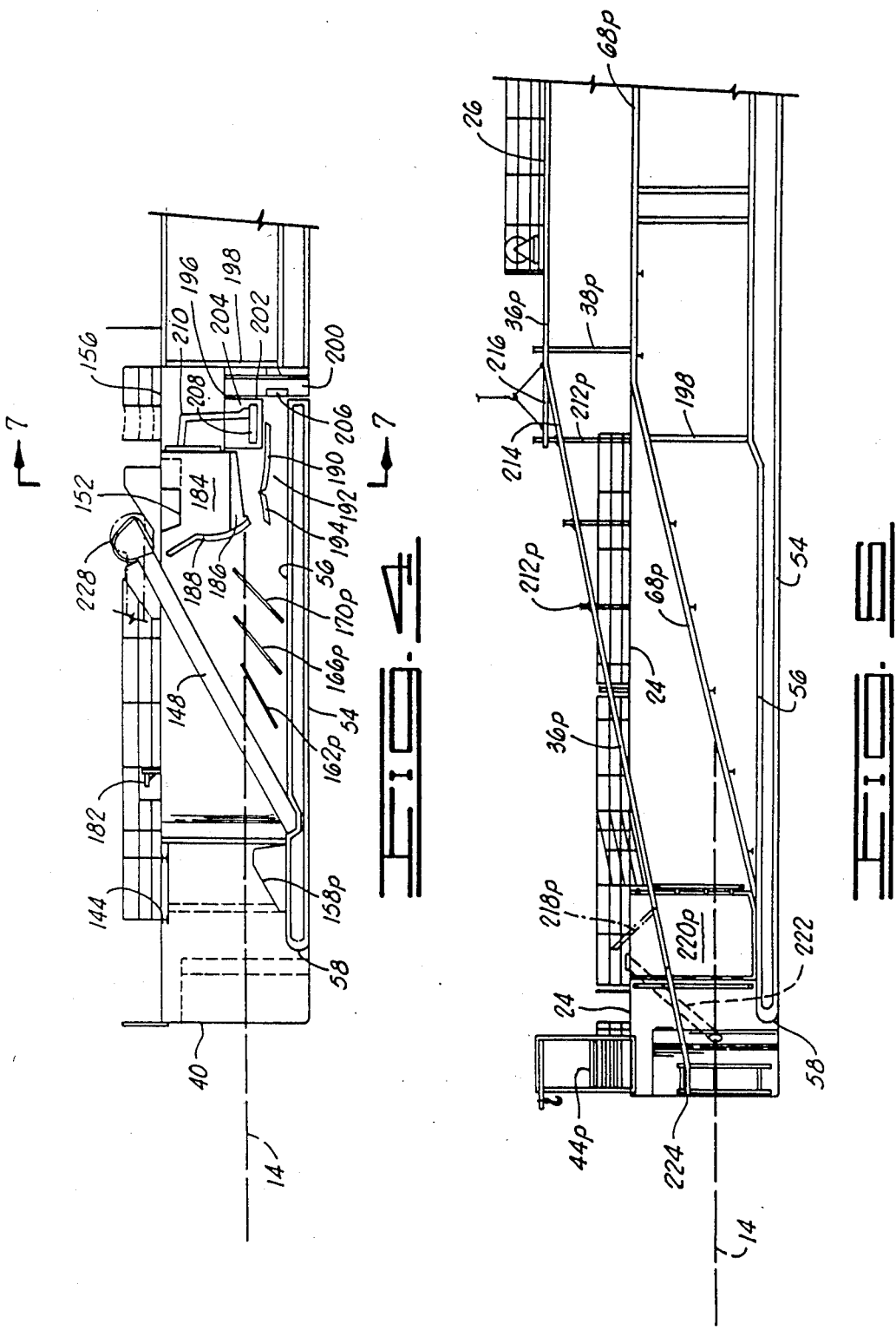

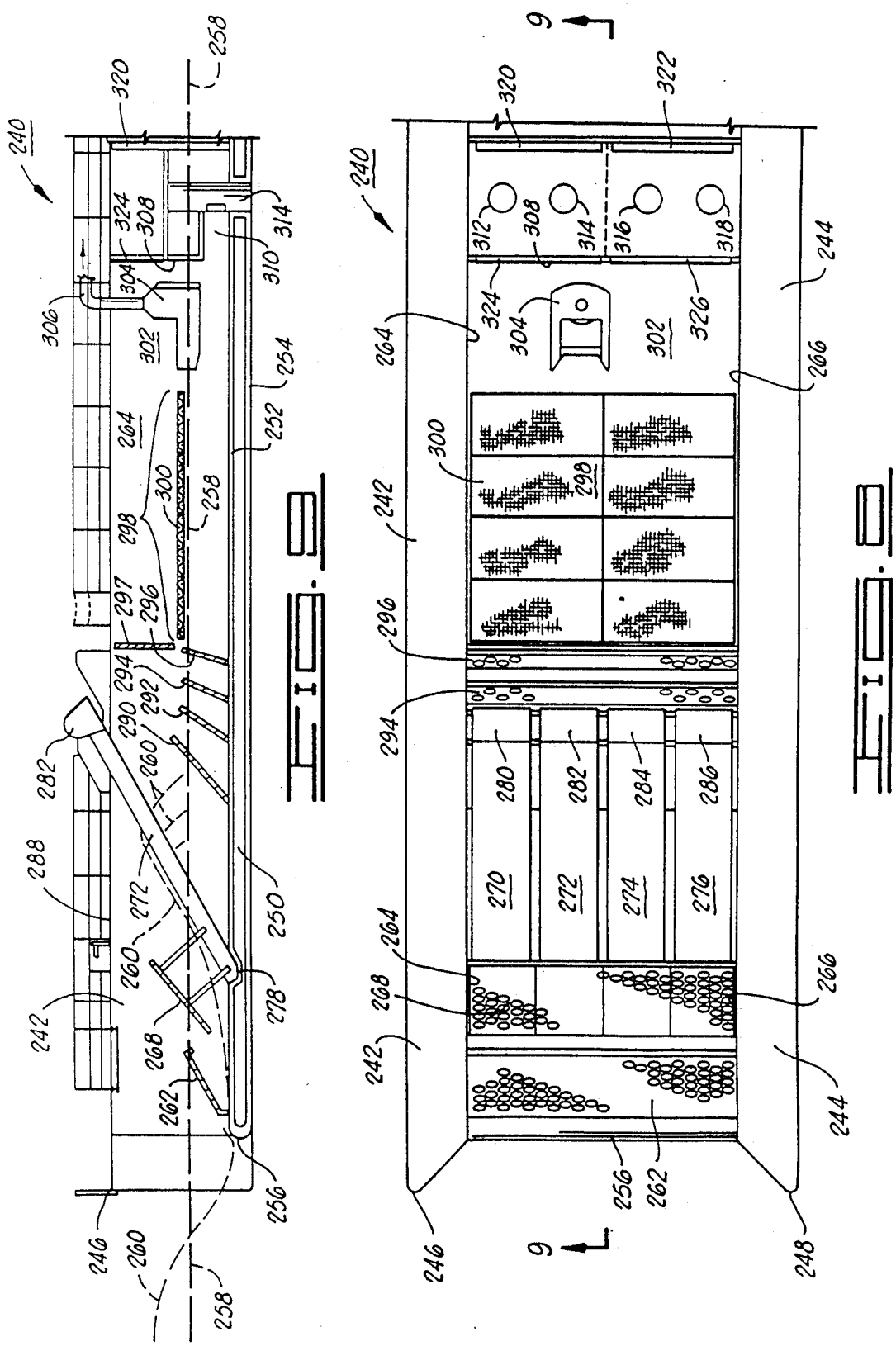

SKIMMING AND UTILITY VESSEL THAT EFFECTS SURFACE SEA CONTROL

BACKGROUND OF THE INVENTION

1. Field of the Invention

The invention relates generally to utility vessels as employed in the petroleum industry and, more particularly, but not by way of limitation, it relates to an improved barge vessel for effective large volume oil skimming and/or for providing a calm water work environment on high seas.

2. Description of the Prior Art

The prior art includes a great number of oil skimming vessels as outfitted with diverse types of oil skimmer equipment, boom structure, tankage and the like. Large volume oil skimming has previously been attempted by vessels towing boom structures for herding the surface oil into a centrally trailing skimmer device. This teaching is exemplified by U.S. Pat. No. 3,684,095 and 3,662,891. Another approach at oil spill confinement is illustrated in U.S. Pat. No. 4,033,869 wherein water spray booms set up herding current flow to direct concentrated surface oil into a skimming device. A great number of individual oil skimmer devices are known in the art and these may take various forms that utilize principles such as weir separation, preferential absorption properites, and the like. No prior art has been found that relates to a specialized barge vessel for calming of higher seas for either oil skimming or other work environment purposes.

SUMMARY OF THE INVENTION

The present invention relates to a particular form of barge vessel having special capabilities for oil skimming and for providing a calm water work station. The barge is a relatively large vessel that is especially constructed to provide requisite tank storage space and sea calming and skimming structure which includes such items as boom and boom handling equipment, primary and secondary oil skimmer equipment, deck cranes, pilot and control station, helipad, and various work and living related spaces. More particularly, the stern of the barge is formed in generally open shape with a sub-surface bottom and opposite sides while including dampener, distributor, and baffle structures transversely across the bottom for receiving advancing sea water. A first oil skimmer device of the porous conveyor type is included within the baffling inlet and sea water that proceeds forward in calmed state is subjected to a second oil skimmer and, finally, remaining sea water is ejected downward through the bottom of the barge by induction pumps. In the skimming operation, the vessel functions to herd and concentrate the oil product, dampen the oily sea, distribute the on-board flow, perform initial liquid separation, baffle and calm water throughput, and finally to perform secondary skimming of the oil with storage of oil and expulsion of water. In addition, the operation could include even a tertiary skimming stage, depending upon the length of the vessel and exigencies of the application.

Therefore, it is an object of the present invention to provide an oil skimming vessel that performs separation of surface oil at high volume per unit time.

It is also an object of the present invention to provide a vessel that is capable of providing a stable, calm water work station within high seas.

It is still another object of the present invention to provide the capability of surface oil skimming from water having a relatively high sea state.

It is yet another object of the present invention to provide a skimming vessel that can effect wave calming and multiple skimming operations of boom herded surface oil.

Finally, it is an object of the present invention to provide a utility vessel having extremely versatile capability in the marine oil industry that is capable variously in oil skimming operations as well as to provide a calm water working position within relatively high wave sea surface.

Other objects and advantages of the invention will be evident from the following detailed description when read in conjunction with the accompanying drawings which illustrate the invention.

BRIEF DESCRIPTION OF THE DRAWINGS

FIG. 4 is a sectional view in elevation through a port porous conveyor belt well of the vessel of FIG. 1;

FIG. 5 is a sectional view in elevation through a port boom ramp portion of the stern of the vessel;

FIG. 8 is a partial top plan view of an alternative structure for utility vessel; and FIG. 9 is a partial longitudinal section of the vessel of FIG. 8.

DETAILED DESCRIPTION OF THE INVENTION

Figure 1:
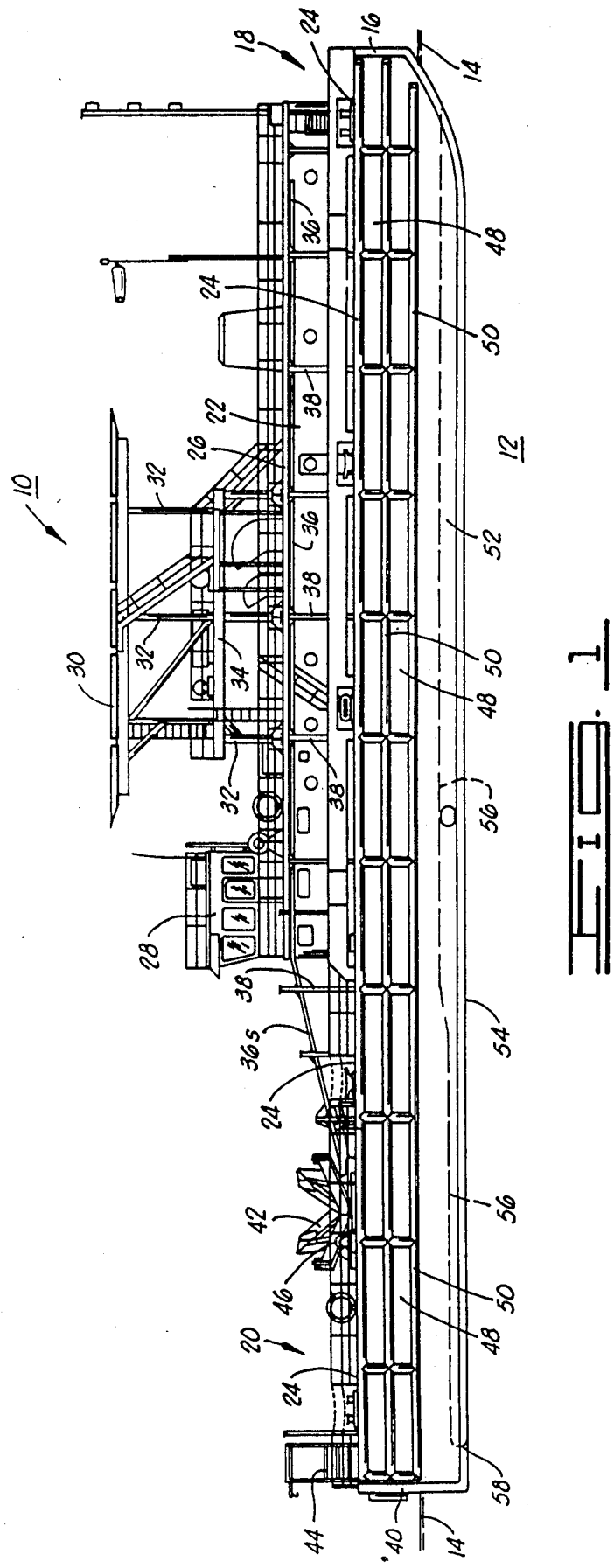
FIG. 1 is a side view in elevation of the vessel of the present invention.

Referring to FIG. 1, the vessel 10 is depicted afloat in a body of water 12 defining sea surface 14. The vessel 10 consists of a hull member 16 having a bow portion 18 and stern portion 20, and supporting main deck compartmentation 22 along the forward portion of a main deck 24. A promenade deck 26 is then disposed along the top of compartmentation 22 supporting a control room 28 at the after portion thereof. A helipad 30 is rigidly supported by a plurality of stanchions 32 above the promenade deck 26 just forward and midships, and an intermediate platform 34 is supported thereunder.

A boom rail 36 supported by a plurality of boom stanchions 38 and promenade deck 26 is disposed along each side of the main deck compartments 22, and the stern portion of the boom rail 36 is inclined at an angle approaching the water line at the transom 40 of stern portion 20. The particular type of boom employed is a curtain type of boom which can be assembled in 50 foot lengths along the boom rail 36 at the forward portion of vessel 10, as will be described. The curtain-type boom may be payed out in 50 foot lengths up to as much as 500 feet sternward thereby to herd surface oil toward the transom 40 of vessel 10. In one mode of operation, motor craft may be used to tow the vessel 10 sternward towards the oil spill while also supporting the outreaching boom panels. Alternatively, and usually for more confined spills, the vessel 10 can be positioned stern first so that surface flow induced by sea direction and the on-board induction pumps tends to herd and concentrate the oil product into the vessel 10, as will be further described below.

The vessel 10 is outfitted with all of the usual deck fittings, compressors, generator equipment, pumping equipment, and the like. One or more articulated cranes 42 are disposed on either side of the stern portion 20 of vessel 10 as a general aid in the skimming and barge handling operation. A boom handling platform 44 provides a position for control of the confinement boom during payout and retrieval as the operator at platform 44 has control of air winches 46 and 47 for such operation.

The side skin 48 of the hull 16 is extensively covered in a rectangular configuration of pipe fendering 50. The modular hull 16 is constructed of a base of centerline bottom void tank 52 consisting of an outer bottom plate 54 and inner bottom plate 56. The double bottom tanks terminate sternward in a rounded, subsurface panel 58, and terminate forward at the collision bulkhead bow portion just aft of where the outer bottom plate 54 bends upward.

Figure 2:
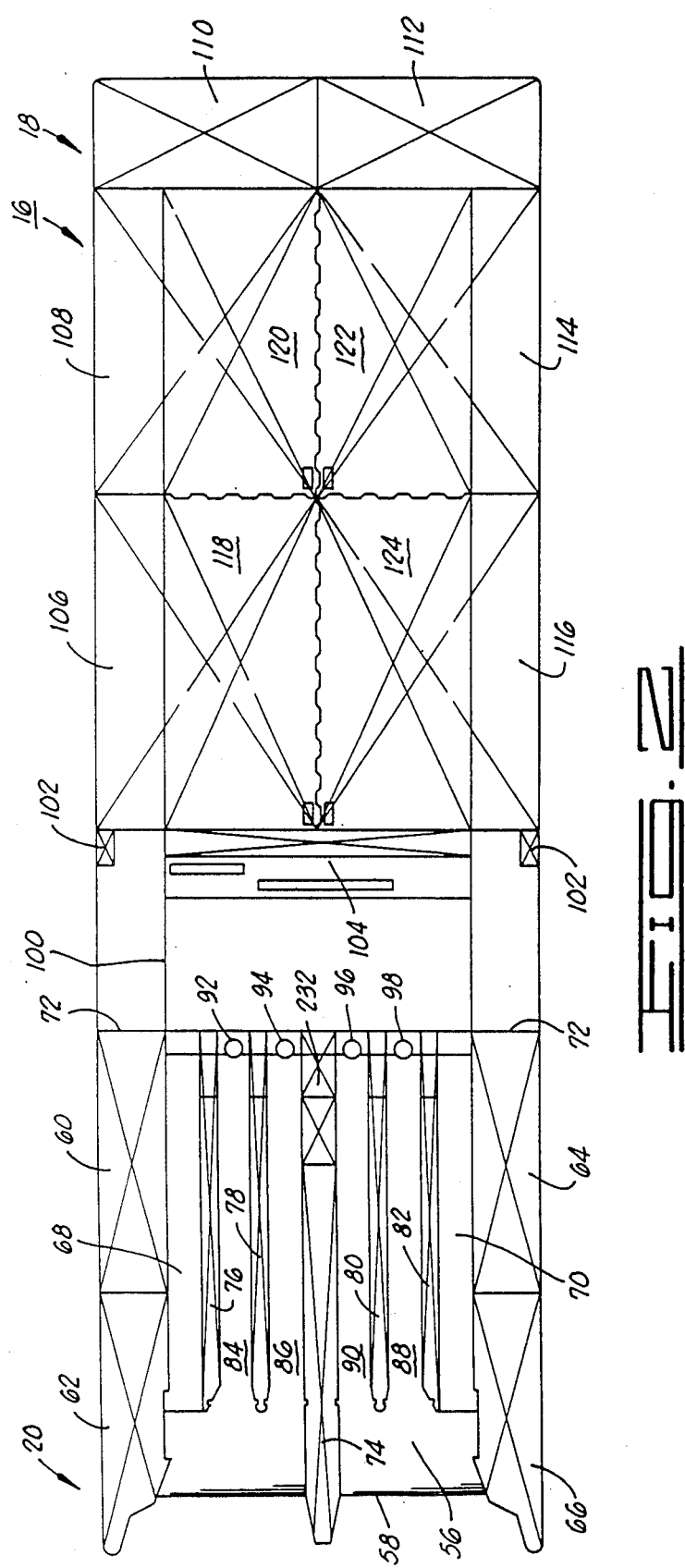
FIG. 2 is a plan view of the tank portion of the vessel of FIG. 1.

Referring to FIG. 2, the remainder of hull 16 between tank inner bottom plate 56 and main deck 24 consists of compartmentation in various sizes, this structure forming the various ballast, voids, pump rooms and storage tanks used throughout the vessel. Thus, as also shown in FIG. 2, the stern compartmentation includes formation of wing tank 60, 62, 64 and 66 which are used for ballast water. Inside of the wing tank structures are the port boom ramp 68 and the counterpart starboard boom ramp 70, each tapering sternward from transverse frame 72 at an angle of about 15° to terminate proximate the rear shelf formed by inner bottom plate 56. A frame structure 74 forms a void space extending along the center line from transverse frame 72 through the stern, and structural voids 76, 78, 80 and 82 are aligned parallel therewith to define port side conveyor belt wells 84 and 86 and starboard side conveyor belt wells 88 and 90. Vertical flow ways 92, 94, 96 and 98 port downward through the bottom tank 52 to provide outflow from induction pumps, as will be further described.

A generally mid-ships compartment section 100 is employed variously for pump housing, certain flushing equipment and void spaces, and port and starboard sea chests 102 provide access for pumping suctions into tanks such as the ballast wing tanks. Ballast manifolds may be located within the compartment 104. Ballast water is also contained forward in each of the port side tanks 106 and 108, bow tanks 110 and 112, and starboard tanks 114 and 116. The centerline port tanks 118 and 120 and starboard centerline tanks 122 and 124 are reserved for containment of recovered oil. It may be noted then that in a barge vessel of present design of 172 feet length and 52 feet beam with hull depth of 14 feet, the various tanks within hull 16 represent a very great amount of storage capacity.

Figure 3:
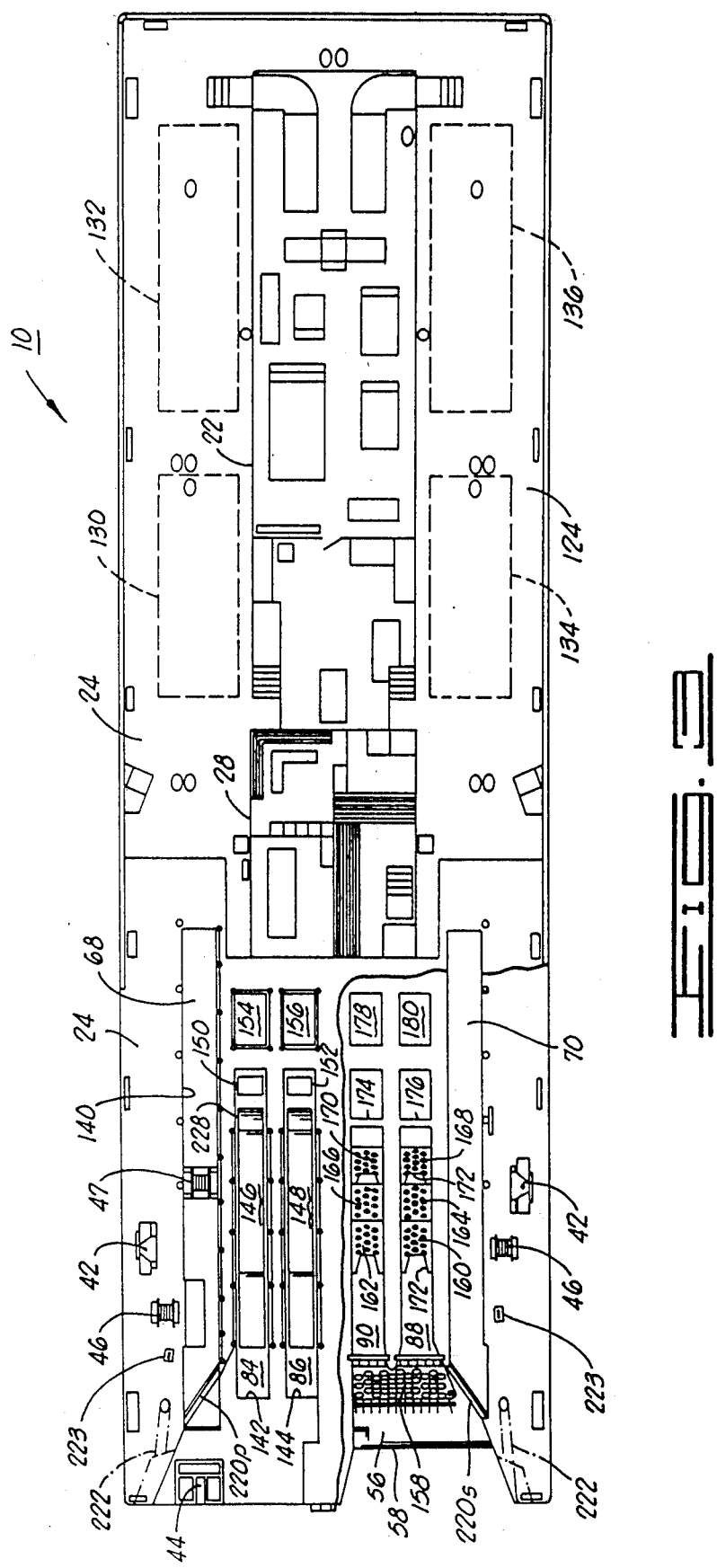
FIG. 3 is a plan view of the main deck of the vessel with starboard quarter portion shown in cutaway.

Referring to FIG. 3, the main deck 24 supports the promenade deck house or control room 28 which includes working space, charts, control assemblies and the like. Underneath the control room 28 on the main deck are rooms to change clothes, the head, the store room, distribution and control hydraulic power, and stairways to the recovered oil and ballast pump rooms. The main deck forward compartment 22 houses various rotating and control equipment, i.e. generators, compressors, pumps and the like. The port boom is stored and hung in accordion fashion as a 200 foot section 130 and a 300 foot section 132 and the starboard boom is similarly stowed as a 200 foot section 134 and a 300 foot section 136. The individual boom sections are made up of 50 foot lengths and can be payed out of any number of combinations up to 500 feet to provide the requisite oil herding envelope. The boom sections are hung in trolley suspension from the boom rail 36 (see FIG. 1) and stand ready to be traversed therealong for entry into the water at the stern of vessel 10.

On main deck 24 aft, and referring to the port side, the boom ramp 68 proceeds downward towards the stern tank top on bottom 56 through an access slot 140 which allows downward passage of the releasing boom curtain rearward under control of the operator at handling platform 44. The starboard side would be similarly constructed in mirror image at the main deck level. Additional elongated port access slots 142 and 144 house the respective port side porous conveyor belt wells 84 and 86 (see FIG. 2). A pair of porous belt conveyors 146 and 148 (shown in the raised position) are housed in the respective wells 84 and 86, and these porous belt rotating conveyors function as part of the primary or initial oil stripping device if the porous belt material is made of oil adsorbing materials. Further, they include respective trash baskets 150 and 152, and each is disposed in line with a respective secondary skimming device 154 and 156 of select operating principle, as well be described.

Beneath the main deck 24, as shown on the after starboard side of vessel 10, the conveyor belt wells 88 and 90 also include certain baffling structure secured along the lower extremities thereof. A wave dampener 158 disposed at an angle of about 32° from the tank top 56 is provided with a plurality of offset rows of holes to provide first contact with incoming water. The holes, on the order of nine inches in diameter, render the dampener plate about 40% open. Further forward of the dampener 158, and disposed forward of the lowered extremity of the respective porous belt conveyor, are a series of baffles which perform a further sea water distribution and calming function. Thus, in each conveyor belt well there is similarly disposed a first baffle 160, 162 disposed at about 30° to tank top 56, a second baffle 164, 166 disposed at about 40° to tank top 56, and a third baffle 168, 170 disposed at about 45° to tank top 56. Each of the first, second and third baffles is similarly formed to include a lower cutout portion 172 (see FIG. 3) and each includes a plurality of offset lines of holes to render the respective baffle plate about 40% open.

In line with respective conveyor belt wells 90 and 88 (starboard) are sump openings 174 and 176 for retrieving the primary stripped oil, as may be squeezed from the porous conveyor belts of the respective belt conveyors. Thus, primary oil recovered at the main deck level from the conveyors is directed downward through the respective trash baskets such as 150, 152 for deposit in respective sump deck cut-outs such as 174, 176 for eventual conduction to one of the recovery oil storage tanks. Some sea water that has proceeded forward past the porous belt conveyors and through the respective baffle trains will then be further treated in a respective secondary skimming position 154, 156, 178 and 180. After the secondary skimming operation, additional recovered oil is pumped to the sump and then to the appropriate storage tank while the sea water is exhausted below the vessel 10 by means of induction pumps or is drained from the sump astern of the conveyor belt, as will be further described.

Referring to FIG. 4, there is shown a section through a typical conveyor belt well 84–88 extending through the stern 20 of vessel 10. Each conveyor belt well 84–88 is essentially an exact duplicate of the other. As shown in FIG. 4, the inboard port well, the representative porous belt conveyor 148 is lowered as shown into the operative position, but may be raised and stowed in the horizontal position by means of a rotating support 182. The primary oil recovery unit or porous adsorption belt conveyor 148 that is used is a commercially available device that is available from Marine Construction And Design Company of Seattle, Washington. The recovery conveyor 148 is essentially described in U.S. Pat. No. 3,992,292 and includes an endless belt of reticular oleophilic, hydrophylic material wherein recovered oil is removed from the conveyor belt by a squeeze roller and the removed oil is deposited in a respective sump 184. A trash basket 152 filters out any algae, flotsam or the like. Primarily recovered oil, within the common sump 184 that enters through openings 174 and 176 on the starboard and typically on the port side as aligned athwartships, is directed midships for conduction to an appropriate recovery oil tank located forward in the vessel (see FIG. 2). Thus, the sump tank bottom 186 (see FIG. 7) is slanted to direct recovered oil arthwartships to the centerline conduction point.

In each respective conveyor belt well 84–88, the forward wall 188 of the respective oil recovery sump is formed as a curved wall that terminates in a horizontal transverse wall 190 defining a longitudinal tunnel 192. The forward sump panel 188 includes a hinged door 194 which is controlled by a hydraulic cylinder (not shown) that serves to adjust forward fluid flow to the secondary recovery or skimmer position. Thus, the horizontal door 194 can be adjusted so that approximately the top six inches or so of the secondary water flowing past baffle 170 is separated back toward the secondary skimmer position as water thereunder flows toward the induction pumps. Not shown, nor needed for present operations, can be installed an air sparger forward of baffle 170 that enhances any entrained oil droplets or emulsions to rise into the secondary skimmer rather than proceeding under wall 190.

The secondary skimming positions 154, 156, 178, 180 are disposed athwartships between successive transverse frames, and each includes the common secondary skimming flat 196 extending artwartships ar approximately eight feet above the outer bottom plate 54. Immediately below the respective secondary skimming flat 196, and just aft of a transverse frame 198, is a respective induction motor 200 that is capable of high volume displacement of water from the tunnel 192 downward below vessel 10. In each conveyor belt well, a plurality of removable, open-ended vertical baskets, e.g. four baskets 202, are secured beneath skimming flat 196 and surround and guide the respective secondary skimming equipment within a chamber 204, as formed just above the transverse tunnel plate 190 and forward of the adjustable door 194. As shown in FIG. 4, this is the position where floating secondary skimming equipment collects oil as contaminated top water flows over door 194 through the secondary skimming chamber 204 and downward to pump inlet 206 for expulsion downward by induction pump 200.

The secondary skimming device 208 is positioned to skim off the topmost contaminant liquid, generally highly concentrated oil, for conduction via a suction hose 210 for deposit in the recovery oil sump 184 storage tank for initial or further separation. The secondary skimmer unit 208 may be any of a number of commercially available devices, but it is preferred to use a weir separation type of device sold under the trademark "SKIM-PAK" that is commercially available from Douglas Engineering of Concord, California, U.S. Pat. No. 3,970,556. This type of skimmer is available in any of several pump capacities ranging from 2,000 gallons per hour up to 18,000 gallons per hour. One simple modification is made to the outer case, which is normally made of fiberglass or stainless steel, as aluminum is substituted because it functions better in the particular secondary skimming application.

FIG. 5 is a section illustrating the port side boom ramp and rail in greater detail, but it should be understood that the starboard section would be a mirror image structure. The boom rail 36p is supported outboard and parallel to the promenade deck 26 in the forward part of vessel 10, and the inclined stern section is supported by a series of gallows-type hanger stanchions 212 which support boom rail 36p downward toward the water line 14 at the stern of vessel 10. Boom sections are stored in accordion manner hanging by trolleys from the boom rail 36p at the forward part of the vessel. See FIG. 3, stored boom sections 130, 132 and 134, 136. The boom rail includes two removable sections for operational advantage. A section 214 is removable and replaceable with a straight section 216 so that it will act as a spreader bar when replacing 50 foot boom sections. Optionally, another removable boom rail section 218 is required for higher door designs to allow closure of the boom ramp door 220 (see FIGS. 3 and 5) after the boom has been launched and skimming is about to start or underway. An air winch 47p may be controlled from the operating platform 44p to assist in payout of boom as it is drawn out via cable connection to a boom lead vessel. Thus, the boom curtains hanging by trolleys traverse along and down boom rail 36 for release into the sea at boom release position 224. Ahead and attached to the boom is a large, buoyant paravane on each side to help support forces at sea from the tugs towline. Another paravane is attached at the end of the boom on each side near the transom 40 and all is held by a chain controlled by winch 46 routed through hawsepipe 222 and secured by chain stopper 223. The first 50 feet of boom curtain includes flotation tubes in the form of ten inch diameter PVC covered ETHAFOAM floats. Starboard boom and boom ramp would be identical structure.

Figure 6:
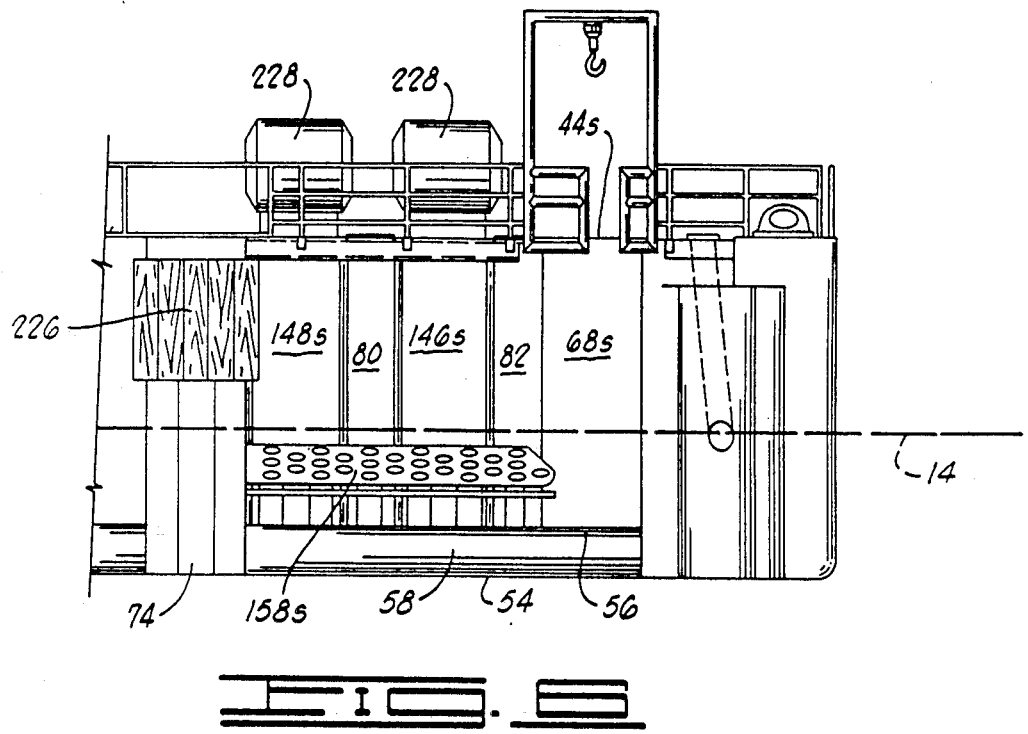
FIG. 6 is a rear view in elevation of the starboard half of the vessel.

FIG. 6 is a stern view of the starboard half of vessel 10 which includes a center mounted wooden fender 226 mounted in line with center void frame structure 74 (FIG. 2), and dividing the two sea entry openings that include the wave dampener 158s and counterpart port side structure. The belt conveyors are shown in their lowered or operational attitude with inboard conveyor 148s and outboard conveyor 146s shown positioned on each side of void structure 80 and the starboard boom ramp 68s disposed further outboard of void structure 82. The boom handling platform 44s is disposed above the boom release position. Porous belt conveyor motors 228 at main deck level are integral with their respective conveyor belt systems.

Figure 7:
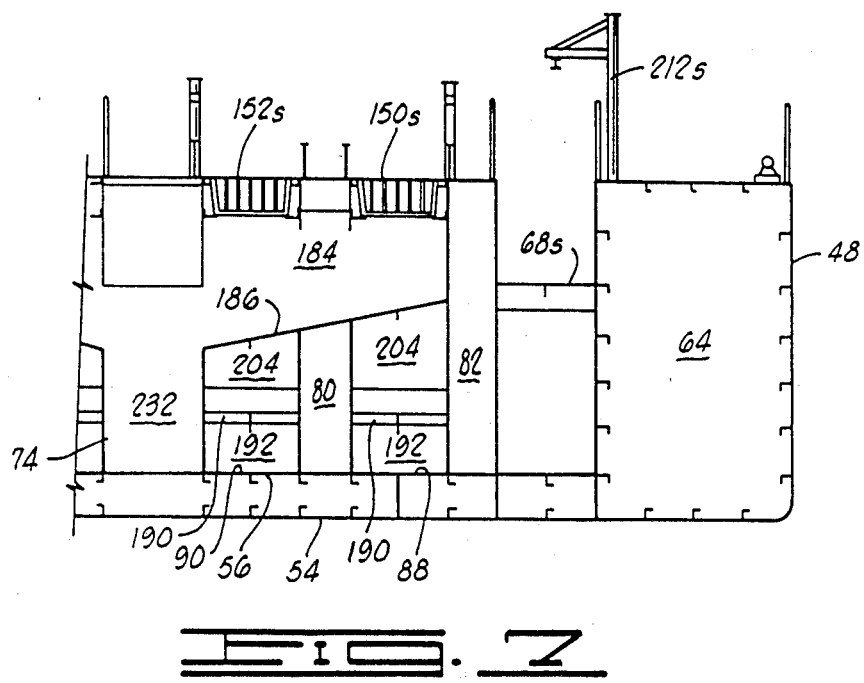
FIG. 7 is a cross-section of the starboard half of the vessel as taken across a mid-frame aft of the induction pumps looking forward.

FIG. 7 is a transverse section of the starboard side of the vessel taken just aft of the transverse frame 198 (frame 72 of FIG. 2) in order to illustrate in greater detail the configuration of the secondary skimming structure and primary oil sump. Thus, in each of the typical conveyor belt wells 88 and 90 there is shown the tunnel sections 192 beneath tunnel plate 190 (see also FIG. 4) and respective openings or flow ways into the secondary skimming chambers 204 of each conveyor belt well. Thus, on both port and starboard, oil extracted from a porous belt conveyor falls through the respective trash baskets 150, 152 into the respective port (or starboard) deck openings to the recovery oil sump 184 which then permits flow centrally to a center line sump 232 disposed forward and within the center void structure 74. Recovered oil may then be conducted forward by pumps in room 100 to selected recovery oil tanks as required to maintain proper ballasting.

In operation, the vessel 10 (FIG. 1) may be towed bow first to its place of operation whereupon the vessel then approaches oil spills, rough seas or the like stern first, either by anchor positioning or by stern towing by one or more vessels. In the oil skimming operation, assuming a large spread, it is desirable to herd the oil product into a concentrated surface body and then to dampen the oily sea water for distributed flow to an initial liquid separation device. Thereafter, the system provides baffling to all water throughput from the first stripping or skimming operation to calm the water for input to a secondary skimming operation. It may yet be desirable to add a tertiary skimming operation if exigencies should require.

Thus, as vessel 10 is on location, the port and starboard booms may be payed out and positioned by boom tow vessels. The starboard boom 134, 136 is stowed on trolleys on the boom rail (FIG. 3) and boom 134 is of approximately 200 feet in length made up of 50 foot sections, the first 50 feet being rigged with flotation, and the boom 136 is a 300 foot section. Thus, the boom can be utilized in any combination of lengths up to about 500 feet, the outermost boom portion sustaining flotation. The port boom sections 130 and 132 are similarly stowed and operable in association with the handling equipment on the port side of vessel 10.

An induction pump 200 (FIG. 4) is operably positioned in each pump well 92, 94, 96 and 98 (FIG. 2), one for each conveyor belt well 84-88. The high volume induction pumps receive sea water entering through the stern opening of the vessel 10 and expel water downward through the bottom of the vessel. Some water may be drawn through the vessel stern by the induction pumps to increase current flow, or the operation may also be directed into existing sea as the vessel is moved toward the wave action. In each of the four porous belt conveyor sections, the water is first washed across the dampener plate 158, a perforated plate that is about 40% open. Water is then flowed upward onto a belt conveyor 148 driven at controlled velocity by a motor 228 and the porous conveyor belt extracts an initial portion of contaminant oil from the sea water to remove energy from the waves so that flow is calm on the water surface as it proceeds past baffle 170. This primary portion of oil is rolled from the porous conveyor belt and drained into a respective recovery oil sump 184 for flow to the central sump 232 and conduction to recovered oil tanks forward in the vessel.

A further part of the contaminated water, albeit that it is considerations calmed by the dampener 58 and conveyor 148, passes forward of the conveyor 148 toward the secondary skimming operation. This water is subjected to consecutive baffles 162, 166 and 170 to further quiet the surface action of the contaminated water, and the respective horizontal door 194 is hydraulically actuated to skim a predetermined amount of contaminated oil/water off the top of surface 14 for entry into the secondary skimming chamber 204. A secondary skimmer of the weir separation type, skimmer 208, is then utilized to further skim any remaining surface oil contaminant from the water, and this separated oil is pumped by a suction pump through line 210 to the sump 184 and later to the appropriate recovered oil tank forward in the vessel. After having undergone secondary skimming the sea water flowing through secondary skimming chamber 204 flows downward past the forward edge of horizontal plate 190 into the forward portion of tunnel 192 and induction pump 200 for expulsion out the bottom of the vessel.

This identical structure and operation is present through each of the parallel arrayed conveyor belt wells 84, 86, 90 and 88. It should also be understood that vessels with less or even wider beam and a different number of conveyor belt wells in array may be considered as a matter of design selection. Also, still further refinement of separated portions of the oil/water product may be subjected to tertiary skimming or other stripping procedures.

FIGS. 8 and 9 relate to an alternative form of utility vessel 240 that may be capable of more versatile usage in performance of various types of oil skimming techniques as well as other construction duties. The forward portion (not shown) of vessel 240 may be constructed similarly to the forward portion of vessel 10 as previously discussed. The alternative modification is primarily concerned with the spacing and alignment of components in the stern portion and a longitudinal enlargement sufficient to establish a work space or calm water environment within the after part of the vessel.

Vessel 240 may be formed having port side frame structure 242 and starboard side frame structure 244 similar to vessel 10, and the side frame structures may include various tank compartmentation and the like. Each of the side frame structures terminates in flow directive points 246 and 248, and each is secured to a tank bottom 250 consisting of an inner bottom 252 and an outer bottom 254 that form a rear ledge 256 across the stern.

A water line is indicated by dashed line 258 and a diminishing sinusoidal line 260 illustrates wave action about the median line. The stern of vessel 240 includes a series of reactors for encountering the incoming wave action and greatly diminishing further wave effects. A dampener plate 262 is secured as by welding transversely between the inner skin 264 of side frame structure 242 and the starboard inner skin 266. The dampener plate 262 is a perforate, flat expanse that is on the order of 30% to 50% open and secured to the inner bottom plate 252 to extend forward and upward at an angle of about 32°. A plurality of distributor plates 268 are then secured to the respective conveyor frames to extend transversely between inner skins 264 and 266 immediately forward of the proximate the dampener plate 262. Each distributor plate 268 is also a generally rectangular plate on the order of 30% to 50% open and disposed in elevation from the dampener plate 262 and secured generally parallel to the conveyor apparatus, as will be described.

It has been found preferable that the distributor plates 268 overlap the stern portions of respective conveyor assemblies 270, 272, 274 and 276 as they are secured to extend from a conveyor well 278, formed in inner bottom 252, forward and upward where the conveyor motor and drive assemblies 280, 282, 284 and 286 are located, i.e. at the main deck level 288. While the conveyor assemblies may be such as the porous belt conveyors used in primary oil skimming, greatly effective quieting of high seas may be obtained by using pairs of conveyors in series or a still more porous yet thicker and permeable rotating conveyor belt, i.e. one that is considerably stronger, but not necessarily needing the affinity to sorb oil.

Some wave water and dispersed water then proceeds through the line of conveyors to a series of baffles that are located serially beneath and closely in front of the conveyor line. Thus, a series of transverse baffle plates 290, 292, 294 and 296 are disposed in spaced relationship with each successive baffle plate secured between opposite side skins 264 and 266 at successively greater angles proceeding forward. The baffle plates 290–296 are each formed similarly as a perforate, flat plate on the order of 30–50% open, and they are secured transversely at successively greater forward angles proceeding stern to bow, i.e. more rearward baffle plate 290 is disposed approximately parallel to the conveyor at about 30° while the more forward baffle plate 296 is disposed at a greater forward angle on the order of 45°. Each of the dampener plate 262, distributor plate 268 and baffle plates 290–296 may be formed from such as quarter inch plate steel with a plurality of longitudinal stiffener members as needed.

Proceeding on forward beyond wind wall 297, there is a quiet, calm water zone which may be designated as work room or zone 298. In this zone, even extremely high seas may be reduced to very small waves or ripples. A removable floor grating structure 300 is then suitably secured to extend over the work zone 298 as positioned a few inches above the operating water line 258. Partitions in the floor can be either used or removed to suit the particular task being undertaken, e.g. pipeline fabrication or such. Forward of work zone 298 is a secondary skimming or equipment operating zone 302 which may include one or more secondary skimming devices 304 that provide oil removal and conduction forward via conduit 306 or the like. In some cases, the utility vessel 240 may be used for other than a skimming operation whereupon the skimming units 304 may be replaced with pipeline welding, fabricating, materials handling devices, or other components of construction by inclusion of additional grating structure or other machinery used in the utility operation.

Vessel 240 is then formed with a transverse bulkhead 308 which is bent at a right angle proximate the inner bottom 252 to form a tunnel portion 310 leading into a respective one of the induction pumps 312, 314, 316 and 318. Movable floodgates 320, 322, 324 and 326 may be included adjacent to and forward of the induction pumps in order to provide further direction of water coming through the tunnel portions of the induction pump zones or to extend dry workspace.

In operation, the utility vessel 240 would function in much the same manner as the vessel 10 except that calming of higher seas is possible, and a primary aim of working longer periods at sea is provided to vessel designers. Using an array similar to that of FIGS. 8 and 9, i.e. similar arrangement and positioning of dampener plate 262, distributor plate 268, conveyor 272 and baffles 290–296, enabled calming of six to ten foot maximum waves to a surface irregularity of ±3 inches in full scale testing. This is the equivalent of lower Sea State 5. With four foot significant seas of Sea State 3, surface irregularity was achieved at ±1 inch in the work zone 298, and with two to two and one-half foot seas the surface irregularity in zone 298 is negligible if not unobservable. Even the vessel effect of pitching and rolling does not hamper the calming. Sea water is aerated to momentary foaminess in the larger Sea States, but foaming is predominantly absent in the Sea State 2 and lower.

Such spectacular calming is achieved for the purpose of enabling effective oil contaminant skimming; however, for a general work environment and safety for people that must be near the water surface on a vessel at sea, the sea calming measures are similarly effective. In addition, the work zone 298 can be enlarged by removal of secondary skimming devices. It has been noted and experienced that with waves as high as ten feet, a worker standing on the work station as close as ten or twelve feet forward of the conveyor can remain relatively dry and unaffected despite the immense force of the high sea immediately in front of the conveyor.

The foregoing discloses a novel utility vessel that may be used variously in large volume oil spill clean-up or pickup of other debris while also having the capability of being positioned in high seas to provide a calm water, sea level work position for marine construction jobs that may require such environment. The vessel utilizes a combination of porous conveyor assemblies and transverse dampener, distributor and baffle plates to effect very great calming of high seas within a relatively short space thereby to enable more effective oil skimming in rougher water and/or to enable a relatively better work station for carrying out any of oil control or other construction operations. It should be understood that the particular spacing, angular orientation and order of positioning of the sea obstructing elements might be varied significantly in order to achieve specific sea handling results.

Changes may be made in combination and arrangement of developments as heretofor set forth in the specification and shown in the drawings; it being understood that changes may be made in the embodiments disclosed without departing from the spirit and scope of the invention as defined in the following claims.

What is claimed is:

1. A utility vessel for cleaning oil from an oil/water mixture in a body of water, said utility vessel comprising:

hull means with a bow, sides and bottom having an open stern with a rearward bottom below the water in said body of water;

wave dampener means secured to the bottom across the open stern for immersion in the incoming oil/water mixture;

oil stripper means receiving said oil/water mixture and extracting a first quantity of oil, said oil stripper means comprising:

conveyor means having first and second ends and including a rotational belt of porous oleophilic, hydrophobic material, having the first end immersed in the incoming oil/water; and means at the second end for extracting oil from said belt for storage;

baffle means receiving oil/water mixture flowing past said oil stripper means to calm further the forward flowing oil/water;

oil skimming means disposed forward of said baffle means for further removing a second quantity of oil, said oil skimming means comprising:
  a weir assembly separating a top oil portion of the further calmed oil/water flowing forward of said baffle means; and
  means for drawing off said separated oil portion for conduction to storage;
induction pump means drawing water past said oil skimming means for expulsion from the vessel;
retrievable, floatable boom means stored on said hull means;
boom handling means for deploying said boom means, in herding, and in concentrating said oil/water mixture in said body of water;
a plurality of transverse partial bulkheads secured athwart the hull means forward of the respective baffle means, each said bulkhead extending downward below the surface of said forward flowing oil/water and bending forward to define a tunnel relative to the bottom; and
a plurality of adjustable horizontal door means disposed through the respective bulkhead below the surface of said forward flowing oil/water and above said forward bend of said bulkhead thereby to enable selective separation of said oil/water for flow into a zone above the tunnel formed by each bulkhead extending downward below the surface of said forward flowing oil/water and bending forward relative to the bottom of said hull containing said respective skimming means
whereby said utility vessel is moved bow first to said oil/water mixture in said body of water and subsequently moved stern first by said retrievable, floatable boom means when said boom means are deployed from the stored position on said vessel, said oil/water mixture flowing over said wave dampener means into said utility vessel where said oil stripper means extract a first quantity of oil from said oil/water mixture, the oil/water mixture then flowing past said oil stripper means and being calmed by said baffle means to facilitate further removal of a second quantity of oil from said oil/water mixture by said oil skimming means which is disposed forward of said baffle means with said induction pump means drawing water past said oil skimming means for expulsion from said utility vessel.

2. A utility vessel as set forth in claim 1 which further includes:
  distributor plate means of partially open expanse secured between vessel opposite sides and aligned generally parallel to said inclined endless belt means and positioned over the lower, rearward portion of said endless belt means at a spaced distance thereabove.

3. A utility vessel as set forth in claim 2 wherein said dampener means comprises:
  a partially open plate having relatively large holes and secured to extend between said vessel opposite sides at a forwardly inclined angle of about 32°.

4. A utility vessel as set forth in claim 1, which further includes:
  a plurality of void frame structures secured to the hull means bottom thereby to separate each longitudinal alignment of oil stripper means, baffle means, oil skimming means and induction pump means into an individual compartment.

5. A utility vessel as set forth in claim 1 wherein each said conveyor means comprises:
  a conveyor assembly with endless belt having rear and front ends and disposed at a forward ascending angle of about 30° extending from the bottom to the main deck level, said conveyor assembly being positioned forward of the dampener means to receive dispersed forward wave flow at about the longitudinal mid-point of said endless belt.

* * * * *

UNITED STATES PATENT AND TRADEMARK OFFICE
CERTIFICATE OF CORRECTION

PATENT NO. : 4,653,421

DATED : March 31, 1987

INVENTOR(S) : William M. Ayers

It is certified that error appears in the above-identified patent and that said Letters Patent is hereby corrected as shown below:

In column 7, line 65, delete the word [considerations] and insert therefor--considerably--.

Signed and Sealed this

Eleventh Day of August, 1987

*Attest:*

DONALD J. QUIGG

*Attesting Officer*   *Commissioner of Patents and Trademarks*